United States Patent [19]

Boggs

[11] Patent Number: 4,704,241
[45] Date of Patent: Nov. 3, 1987

[54] DEFLASHING METHOD

[75] Inventor: Beryl A. Boggs, Richmond, Va.

[73] Assignee: Allied Corporation, Morris Township, Morris County, N.J.

[21] Appl. No.: 809,614.

[22] Filed: Dec. 16, 1985

[51] Int. Cl.$^4$ ............................................. B29C 17/2
[52] U.S. Cl. ....................................... 264/161; 225/1; 225/97; 29/81 H
[58] Field of Search ............ 225/97.1; 29/81 E, 81 H, 29/81 J; 125/26, 5; 425/806 R; 264/161

[56] References Cited

U.S. PATENT DOCUMENTS

| | | | |
|---|---|---|---|
| 65,990 | 6/1867 | Bailey | 125/5 |
| 1,597,332 | 8/1926 | Waddell | 29/81 E |
| 2,058,229 | 10/1936 | Hodgkins | 29/81 H |
| 2,279,922 | 4/1942 | Kraner | 125/5 |
| 3,456,639 | 7/1969 | Steinbacher | 125/26 |
| 3,767,096 | 10/1973 | Coscia | 225/97 |
| 3,965,231 | 6/1976 | Depka | 125/26 |
| 4,200,947 | 5/1980 | Ali | 125/5 |
| 4,445,248 | 5/1984 | Hait | 29/81 J |

Primary Examiner—Harold D. Whitehead

[57] ABSTRACT

Method and apparatus for removing flash from an article are provided. The method features the steps of striking the flash with a first lash at least partially along the side of the lash with enough force to initiate separation of the flash from the article while simultaneously supporting the lash sufficiently to prevent the lash from bending sharply on itself and breaking; these steps are repeated until the flash has been completely separated from the article. The apparatus comprises at least one lash with sufficient support to prevent it from bending on itself and breaking, and means for rotating the lash about a central axis for contact with the flash.

4 Claims, 4 Drawing Figures

DEFLASHING METHOD

BACKGROUND OF THE INVENTION

1. Field of the Invention

This invention relates to a method and apparatus for removing flash from an article. More particularly, this invention relates to a rotary wheel deflasher with lashes which deflash a fiber reinforced molded plastic article.

2. The Prior Art

The removal of the thin ridge or area of roughness produced in cutting or shaping metal is known as deburring. Deburring has been accomplished in many ways, e.g. with vibratory tumblers, flap wheels and abrasive-bristle brushes. With the latter, new grit or cutting edges are continuously exposed to provide a clean tool with long life.

When articles are molded from thermosets, thermoplastics, rubber and the like, the initial product often has extra material called "flash" attached along the mold parting line. Flash results from that portion of the charge which flows from or is extruded from the mold cavity during molding, and is undesirable on most final products. The removal of flash, or "deflashing", has been accomplished in many ways, e.g., deflashing manually with razor blades, rotating or shaking with abrasive media to break off the flash, and deflashing cryogenically. In the latter, flash is cryogenically embrittled followed by impact with deflashing media, such as pelletized steel or plastic shot, and/or tumbling. Various types of cryogenic deflashing apparatus are taught by U.S. Pat. Nos. 3,827,186 to Ehnot, 3 909 988 to Kerwin et al., 4 312 156 to McWhorter and 4 519 812 to Brull et al., all of which are hereby incorporated by reference.

Deflashing has been complicated by the inclusion of some types of reinforcing staple fiber in compounds to be molded. Many compression molded plastic parts reinforced with nylon or polyester staple fibers (as well as with fiber glass) have a very heavy, excess flashing which cannot be removed by automatic deflashing machines due to a tendency of the flash to adhere to the reinforcing polyester fiber. This problem does not exist with 100 percent fiber glass reinforced plastic parts, since the fiber glass is easily broken off with a crude tool, such as a piece of wood rubbed against the flashing.

SUMMARY OF THE INVENTION

The present invention provides a method for removing flash from an article. Both metal and plastic articles are contemplated the former preferably being cast or machined and, the latter preferably being molded. Thus, flash is deemed to also encompass metal burrs in the accompanying description and claims. Exemplary of suitable molding systems for plastics are compression and injection molding systems, the former being preferred.

The method comprises the steps of striking the flash with a first lash at least partially along the side of the lash (as opposed to the tip of the tip of the lash alone) with enough force to initiate separation of the flash from the article while simulaneously supporting the lash sufficiently to prevent the lash from bending over on itself and breaking. The flash is struck with succeeding lashes at least partially along their respective sides to completely separate the flash from the article while simultaneously supporting those lashes sufficiently to prevent them from bending over on themselves and breaking. The succeeding lashes may be the first lash brought into contact with the flash repeatedly, or there may be a plurality of lashes rotated about a common axis at a speed sufficent to cause each of the lashes to tend to stick straight out from the axis. In this instance each of the lashes has a tip, remote from the axis, which rotates at a speed of about 9,000–20,000 ft./min. (2,700–6,100 m/min.). Each of the lashes preferably comprises either a monofilament or a multifilament having a diameter of about 0.030–0.200 inch (0.076–0.508 cm), preferably 0.030–0.130 inch (0.076–0.330 cm).

The method is performed by an apparatus for removing flash from an article which comprises at least one lash, means for rotating the lash about a central axis, and means for supporting the lash sufficiently to prevent the lash from bending over on itself and breaking. The supporting means preferably comprises a curved surface mounted adjacent to the lash so that the lash bends over the curved surface when the lash is rotated to contact the flash. It is preferred that there be a plurality of lashes, each of which is mounted to a rotatable wheel along its periphery/circumference and each of which has a supporting means, preferably in the form of a curved surface, located between it and the next adjacent lash opposite the direction of rotation of the wheel. Each of the lashes extends out from the wheel about one to two inches (2.5 to 5.0 cm) beyond the adjacent supporting means. This ensures that at least part of the side of the lash can be utilized in the deflashing. Lash diameters are as stated above. The preferred lashes of the deflashing apparatus of this invention are mono- or multifilament of polyester, polyamide, polyethylene or polypropylene. Suitable polyesters and polyamides are listed below as acceptable reinforcing fibers for use in molded plastic articles. Nylon abrasive monofilament such as Nybrad ® brand (see U.S. Pat. Nos. 3,522,342 and 3,947,169, hereby incorporated by reference) and ultrahigh weight average molecular weight polyethylene such as Spectra ® 900 and 1000 brands are also suitable. Both are commercially available from Allied Corporation. The lash contemplated by this invention is both pliant and tough. Flexible wires, coated with nylon or another plastic as by extrusion and impregnated with a conventional abrasive, are also acceptable as lashes.

When the article to be deflashed is plastic it is preferably also at least partially fiber reinforced, the preferred reinforcing fibers being hybrid blends of polyester or polyamide with fiberglass.

The preferred reinforcing polyesters are the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4-dibenzoic acid, 2,8-dibenzofurandicarboxylic acid, or 2,6-naphthalene dicarboxylic acid. The glycols may contain more than two carbon atoms in the chain, e.g., diethylene glycol, butylene glycol, decamethylene glycol, and bis(1,4-hydroxymethyl)cyclohexane. Examples of linear terephthalate polyesters which may be employed include poly(ethylene terephthalate), poly(ethylene terephthalate/5-chloroisophthalate)(85/15), poly(ethylene terephthalate/5-[sodium sulfo]-isophthalate)(97/3), poly(cyclohexane-1,4-dimethylene terephthalate), and poly(cylohexane-1,4- dimethylene terephthalate/hexahydroterephthalate)(75/25). The preferred polyesters are commercially available from Allied Corporation as 1W71-HI, 1W71-LO, 1W69-HI and 1W69-LO.

Suitable reinforcing polyamides include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl)methane and dodecanedioic acid, or by polymerization of 6-caprolactam, 7-aminoheptanoic acid, 8-caprolactam, 9-aminopelargonic acid, 11-aminoundecanoic acid, and 12-dodecalactam, known as nylon 6, nylon 7, nylon 8, nylon 9, nylon 11 and nylon 12, respectively. Other suitable reinforcing polyamides include the aramids, e.g., Kevlar ®. The most preferred polyamide is nylon 6 commercially available from Allied Corporation as IR69-HI and IR69-LO.

The resin matrix utilized in forming the compound may include thermosetting or thermoplastic (including polyolefin) resins. Suitable thermosetting resins include polyester (preferably unsaturated), polyurethane, epoxy, or vinylester resin systems. Suitable thermoplastic resin systems include polyvinyl chloride, polyethylene, polypropylene, polystyrene, polyvinyl alcohol, polyamide, polyurethane, etc.

DESCRIPTION OF THE PREFERRED EMBODIMENT

Figure 1:
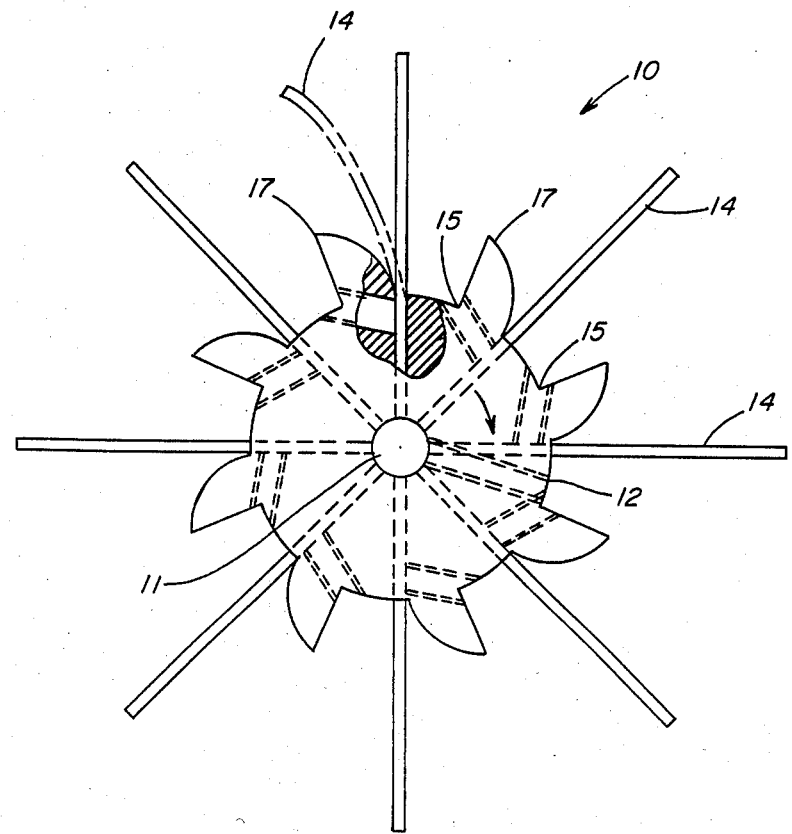
FIG. 1 is a front view with partial section of the rotary wheel 10 deflasher of the present invention.
Figure 2:
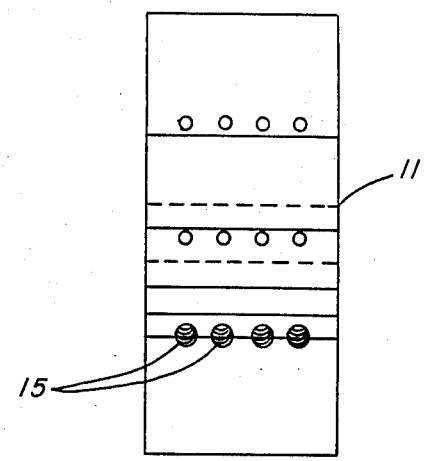
FIG. 2 is a side view of wheel 10 of FIG. 1.

In the accompanying drawings, like numbers refer to like apparatus. In FIGS. 1 and 2 is shown a bench-mounted or handheld deflashing wheel 10 which is bored out at 11 to slide onto the shaft of an air or electric motor. Wheel 10 is mounted to the shaft by a set screw at 12. Wheel 10 could also be keyed for mounting.

Wheel 10 has a plurality of lashes/bristles 14 mounted about its circumference or periphery. In FIGS. 1 and 2, lashes 14 are placed in holes drilled into wheel 11 from its periphery and towards its central axis, and are held in place by set screws at 15 in FIGS. 1 and 2 and at 16 in FIGS. 3 and 4. Lashes 14 preferably are monofilament or multifilament, more preferably the former. Lash 14 diameter ranges from 0.030 to 0.200 inch (0.076 to 0.508 cm), preferably 0.030 to 0.130 inch (0.076 to 0.330 cm). At smaller diameters, lash 14 will not deflash, i.e. is ineffective; at larger diameters windage becomes a problem, i.e. air tends to bend the lash back when wheel 10 or 10' is rotated.

Figure 3:
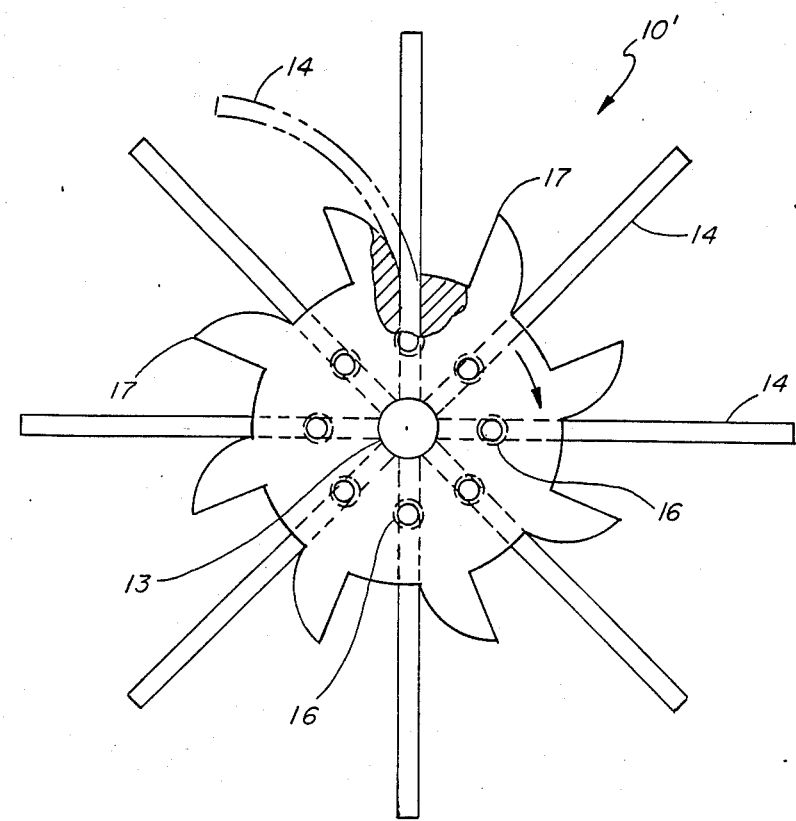
FIG. 3 is a front view with partial section of an alternate rotary wheel 10' deflasher of the present invention.

During rotation of wheel 10 or 10' in the direction of the arrows shown in FIGS. 1 and 3, lashes 14 tend to stick straight out from the axis of wheels 10 or 10', as shown. Rotating lashes 14 are brought into contact with the flash/burr of an article to be deflashed/deburred. When lashes 14 strike the flash, they are bent back as shown in phantom for a single lash 14 in each of FIGS. 1 and 3. Lashes 14 would bend sharply over the small radius and break prematurely during deflashing but for the provision of lash supports 17. Lash supports 17 are curved surfaces mounted adjacent to lashes 14 so that lashes 14 bend over the curved surface (a gradual curve) when lashes 14 are rotated and contact the flash. Lashes 14 are placed right next to curved surface 17, which is depicted as a radiused edge. Lash support 17 could be symmetrical between lashes 14 to permit rotation of wheel 10 or 10' in either direction. The depicted design was simply cheaper to fabricate.

The length of lashes 14 should be such that they extend approximately 1 to 2 inches (2.5 to 5.0 cm) beyond lash support 17 when wrapped on lash support 17. As lashes 14 are made longer than this, air will tend to bend the lash back during rotation of wheel 10 or 10'; if its length is less, it is not as effective since there is less of the side of lash 14 to actually strike the flash. The very tip of lashes 14 will be at a speed of 9000 to 20,000 feet per minute (2700 to 6100 meters per minute), depending upon lash 14 diameter, the faster speed corresponding to the smaller diameter.

The following steps detail operation. The motor is cut on, which ultimately results in rotation of wheel 10 or 10', tip of lashes 14 being at a speed of 9000 to 20,000 feet per minute (2700 to 6100 meters per minute). Wheel 10 or 10' is then brought into proximity with the article to be deflashed. The flash is struck by lashes 14 primarily along their sides (as opposed to only the tip) with enough force to initiate separation of the flash from the article. Lashes 14 are simultaneously supported by lash support 17 to prevent their sharply bending over on themselves and breaking due to the force of contact with the flash. The flash is struck by succeeding lashes at least partially along their respective sides to completely separate the flash from the article. A single lash 14 may be used or a plurality. The apparatus depicted may be modified to be a single lash 14 embodiment by putting only one lash 14 in.

Wheel 10 or 10' preferably is made of an aluminum alloy; however, it may also be made of plastic or steel. In the preferred embodiment, wheel 10 is 1.25 inches (3.18 cm) thick and has a diameter of 2.0 inches (5.0 cm), excluding lash supports 17, which extend at the perpendicular an additional 0.50 inch (1.3 cm) out. If the top lash of FIG. 1 is considered 0°, then four apertures to receive lashes 14 are drilled at 45° intervals around the periphery/circumference of wheel 10.

The four apertures are located at each degree interval immediately adjacent a lash support 17, which has a radius of 0.406 inch (1.03 cm). With reference to FIG. 2 it can be seen that there are four circumferential rows of apertures each located approximately 0.25 inch (0.63 cm) apart. Two lashes 14 are placed in odd apertures at 0°. Apertures of the same circumferential rows will be filled at 90°, 180°, and 270°. With respect to the apertures at 45°, 135°, 225° and 315°, two lashes 14 are placed offset from those at the other intervals. This provides sixteen lashes 14 for the rotary wheel. There are eight lash supports 17.

Figure 4:
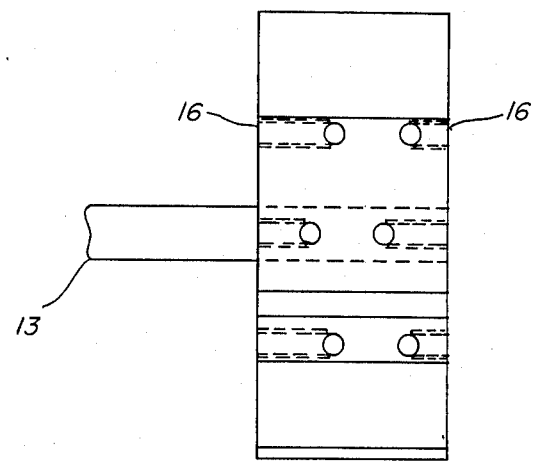
FIG. 4 is a side view of wheel 10' of FIG. 3.

In the alternate embodiment of FIGS. 3 and 4, the location of apertures with lashes 14 is as described for FIGS. 1 and 2; however, there are only two apertures at each degree interval rather than four. Thus, the device depicted in FIGS. 1 and 2 has greater flexibility. The reason for offsetting lashes 14 as shown is to provide a greater effective diameter for wheel 10 or 10'. Preferred speeds of revolution are 10,000 to 12,000 rpm.

In each of the embodiments described above, a nylon monofilament having a diameter of 0.080 inch (0.203 cm) (Black & Decker No. 82-604) was utilized. Each monofilament had a length (entending beyond diameter of wheel 10 or 10' of 2 inches (5.0 cm).

Wheels of the present invention may be table or bench mounted for passage of the part to be deflashed thereacross. Tracks may be used to guide the parts over, under or by one or more wheels to completely deflash the part in an automatic system.

I claim:

1. A method for removing flash from a molded fiber reinforced plastic article, comprising the steps of:
   a. striking the flash with a first lash at least partially along the side of the lash with enough force to initiate separation of the flash from the article;
   b. simultaneously supporting said lash sufficiently to prevent said lash from bending over an itself and breaking;
   c. striking the flash with succeeding lashes at least partially along their respective sides to completely separate the flash from the article; and
   d. simultaneously supporting said lashes sufficiently to prevent said lashes from bending over on themselves and breaking;
   said lashes comprising material selected from the group consisting of polyamide, polyester, polyethylene and polypropylene;
   wherein said lashes are rotated about a common axis, each of said lashes comprising a tip remote from said axis which rotates at a speed of about 2,700 to 6,100 meters per minute.

2. The method of claim 1 wherein said succeeding lashes are said first lash brought repeatedly into contact with the flash.

3. The method of claim 1 wherein each lash comprises a monofilament having a diameter of about 0.030–0.200 inch (0.076–0.508 cm).

4. The method of claim 1 wherein each lash comprises a multifilament end having a diameter of about 0.030–0.200 inch (0.076–0.508 cm).

* * * * *